United States Patent
Park et al.

(10) Patent No.: US 9,944,277 B2
(45) Date of Patent: Apr. 17, 2018

(54) METHOD FOR LEARNING ENGINE CLUTCH KISS POINT OF HYBRID VEHICLE

(71) Applicant: HYUNDAI MOTOR COMPANY, Seoul (KR)

(72) Inventors: Song Il Park, Seoul (KR); Seongwook Moon, Seoul (KR); Jonghan Oh, Yongin-si (KR); Yeon Bok Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 87 days.

(21) Appl. No.: 15/212,665

(22) Filed: Jul. 18, 2016

(65) Prior Publication Data

US 2017/0166196 A1    Jun. 15, 2017

(30) Foreign Application Priority Data

Dec. 15, 2015    (KR) .......................... 10-2015-0178811

(51) Int. Cl.
*B60W 20/40*    (2016.01)
*B60W 30/18*    (2012.01)
*B60W 10/02*    (2006.01)
(Continued)

(52) U.S. Cl.
CPC ............ *B60W 20/40* (2013.01); *B60W 10/02* (2013.01); *B60W 10/08* (2013.01); *B60W 20/00* (2013.01);
(Continued)

(58) Field of Classification Search
None
See application file for complete search history.

(56) References Cited

U.S. PATENT DOCUMENTS 9,744,842 B2 * 8/2017 Kim ....................... B60K 6/387
2011/0153134 A1   6/2011 Rocq et al.
(Continued)

FOREIGN PATENT DOCUMENTS

DE    10 2011016999 A1    3/2012
DE    10 2012224278 A1    3/2014
(Continued)

OTHER PUBLICATIONS

Extended European Search Report in European Application No. 16179908.5, dated Sep. 28, 2017.

*Primary Examiner* — Jacob S. Scott
(74) *Attorney, Agent, or Firm* — Brinks Gilson & Lione

(57) ABSTRACT

A method for learning an engine clutch kiss point of a hybrid vehicle includes: controlling, by a controller, an engine clutch which connects an engine with a motor or disconnects the engine from the motor so that the engine clutch is engaged after the controller checks stop of the engine and of the motor and stabilization operation for a hydraulic pressure line of the engine clutch is performed; controlling the motor to have a certain speed after the stabilization operation; controlling the engine clutch to be engaged after speed of the motor is stabilized; determining whether torque variation of the motor when the engine clutch is engaged is equal to or greater than a threshold value; and determining a hydraulic pressure at which the torque variation is the threshold value as the kiss point of the engine clutch.

11 Claims, 6 Drawing Sheets

(51) Int. Cl.
  *B60W 10/08* (2006.01)
  *F16D 48/06* (2006.01)
  *B60W 20/00* (2016.01)
(52) U.S. Cl.
  CPC .......... *B60W 30/18054* (2013.01);
    *B60W 30/18072* (2013.01); *F16D 48/06*
    (2013.01); *F16D 48/066* (2013.01); *B60W*
    *2510/0241* (2013.01); *B60W 2510/084*
    (2013.01); *B60W 2710/021* (2013.01); *B60W*
    *2710/081* (2013.01); *B60Y 2300/427*
    (2013.01); *F16D 2500/1066* (2013.01); *F16D*
    *2500/3108* (2013.01); *F16D 2500/50251*
    (2013.01); *F16D 2500/50263* (2013.01); *F16D*
    *2500/50266* (2013.01); *F16D 2500/50281*
    (2013.01); *F16D 2500/70406* (2013.01); *Y10S*
    *903/902* (2013.01)

(56) References Cited

U.S. PATENT DOCUMENTS

2013/0325231 A1* 12/2013 Park .............. B60W 20/10
  701/22
2014/0067174 A1* 3/2014 Park .............. F16H 61/061
  701/22

FOREIGN PATENT DOCUMENTS

| JP | 2014-61750 | 4/2014 |
| KR | 10-2013-0136779 A | 12/2013 |
| KR | 10-1371461 B1 | 3/2014 |
| KR | 10-1459437 | 11/2014 |
| KR | 10-1470209 B1 | 12/2014 |
| KR | 10-2015-0012151 A | 2/2015 |

* cited by examiner

METHOD FOR LEARNING ENGINE CLUTCH KISS POINT OF HYBRID VEHICLE

CROSS-REFERENCE TO RELATED APPLICATION

This application claims priority to and the benefit of Korean Patent Application No. 10-2015-0178811, filed on Dec. 15, 2015, which is incorporated herein by reference in its entirety.

FIELD

The present disclosure relates to a hybrid vehicle (or a hybrid electric vehicle), and more particularly, to a method for learning engine clutch kiss point of a hybrid vehicle.

BACKGROUND

The statements in this section merely provide background information related to the present disclosure and may not constitute prior art.

An environmentally-friendly vehicle includes a fuel cell vehicle, an electric vehicle, a plug-in electric vehicle, and a hybrid vehicle, and typically includes a motor to generate driving force.

A hybrid vehicle, which is an example of the environmentally-friendly vehicle, uses an internal combustion engine and power of a battery together. In other words, the hybrid vehicle efficiently combines and uses power of the internal combustion engine and power of a motor.

The hybrid vehicle may include an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle may include a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be called a battery management system (BMS). The starter-generator can be called an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

The hybrid vehicle operates the engine clutch in order to transmit power or separate power between the motor and the engine for switching the mode. Operation hydraulic pressure of the engine clutch determining an operation of the engine clutch considerably influences drivability, power performance, and fuel efficiency of the hybrid vehicle, so that the operation hydraulic pressure of the engine clutch needs to be accurately controlled.

The operation hydraulic pressure of the engine clutch may be determined by initial hydraulic pressure by which torque is started to be transmitted as both ends of the friction material of the engine clutch are in contact with each other, and feedback hydraulic pressure for adjusting the hydraulic pressure of the engine clutch by receiving feedback of speeds of the engine and the motor. The initial hydraulic pressure point may be called a kiss point.

The kiss point may be changed during the use of the engine clutch. Accordingly, it is desired to control hydraulic pressure of the engine clutch so that the engine clutch may transmit the torque at an appropriate point by learning the kiss point.

SUMMARY

The present disclosure provides a method for learning engine clutch kiss point of a hybrid vehicle which is capable of learning a kiss point of an engine clutch by using a motor (or a driving motor) during stop or travelling of the vehicle.

In one form, the method for learning engine clutch kiss point may include: controlling, by a controller, an engine clutch which connects an engine with a motor or disconnects the engine from the motor so that the engine clutch is engaged after the controller checks stop of the engine and stop of the motor and stabilization operation for a hydraulic pressure line of the engine clutch is performed; controlling, by the controller, the motor to have a certain speed after the stabilization operation is performed; controlling, by the controller, the engine clutch to be engaged after speed of the motor is stabilized; determining, by the controller, whether torque variation of the motor which occurs when the engine clutch is engaged is equal to or greater than a threshold value; and determining, by the controller, hydraulic pressure at which the torque variation is the threshold value as a kiss point of the engine clutch.

A condition for entering the stabilization operation may include a condition in which a transmission transmitting output of the engine and output of the motor is in a parking stage and the hybrid vehicle is in a stopped state.

A kiss point entering condition for determining the kiss point of the engine clutch may include a condition in which a transmission transmitting output of the engine and output of the motor is in a parking stage and the hybrid vehicle is in a stopped state.

In another form, the method for learning engine clutch kiss point of the hybrid vehicle includes: controlling, by a controller, a second motor which is connected to an engine to have a certain speed; controlling, by the controller, an engine clutch which connects the engine with a first motor that starts the hybrid vehicle in an electric vehicle mode or disconnects the engine from the first motor to be engaged after speed of the second motor is stabilized; determining, by the controller, whether torque variation of the second motor which may occur when the engine clutch is engaged is equal to or greater than a threshold value; and determining, by the controller, a hydraulic pressure at which the torque variation is the threshold value as a kiss point of the engine clutch.

The method for learning engine clutch kiss point of the hybrid vehicle may further include: before the hybrid vehicle operates in the electric vehicle mode, the controller controls the engine clutch so that the engine clutch is engaged after the controller checks stop of the engine and stop of the motor and stabilization operation for a hydraulic pressure line of the engine clutch is performed.

A condition for entering the stabilization operation may include a condition in which a transmission configured to transmit an output of the engine and output of the motor is in a drive stage, in a reverse stage or in a neutral stage, and in which the hybrid vehicle is in a stopped state.

A kiss point entering condition for determining the kiss point of the engine clutch may include a condition in which a transmission transmitting output of the engine and output of the motor is in a drive stage or in a reverse stage.

Another form of the present disclosure may provide the method for learning engine clutch kiss point of the hybrid vehicle, including: controlling, by a controller, a second motor which is connected to an engine to have a certain speed; controlling, by the controller, an engine clutch which connects the engine with a first motor or disconnects the engine from the first motor and is released when the hybrid vehicle performs a coasting drive in an electric vehicle mode to be engaged after speed of the second motor is stabilized; determining, by the controller, whether torque variation of the second motor which occurs when the engine clutch is engaged is equal to or greater than a threshold value; and determining, by the controller, hydraulic pressure at which the torque variation is the threshold value as a kiss point of the engine clutch.

The method for learning engine clutch kiss point of the hybrid vehicle may further include: before the hybrid vehicle performs the coasting drive in the electric vehicle mode, the controller controls the engine clutch so that stabilization operation for a hydraulic pressure line of the engine clutch is performed in an engagement state of the engine clutch.

A condition for entering the stabilization operation may include a condition in which a transmission transmitting output of the engine and output of the motor is in a drive stage or in a reverse stage and the hybrid vehicle travels in a hybrid electric vehicle mode.

A kiss point entering condition for determining the kiss point of the engine clutch may include a condition in which a transmission transmitting output of the engine and output of the motor is in a drive stage or in a reverse stage.

The method for learning an engine clutch kiss point of the hybrid vehicle may learn the kiss point of the engine clutch in a start state of the vehicle and a coasting drive state that often occurs during driving of the vehicle to increase learning frequency than other learning methods, thereby improving drivability of the vehicle when the engine is engaged and released.

The present disclosure may be applied to a dry type engine clutch and a wet type engine clutch, and may be applied to the hybrid vehicle that includes a transmission-mounted electric device (TMED) system including the dry type engine clutch. Friction surface characteristic of the dry type engine clutch may greatly change in real time, and thus the clutch should have high learning frequency.

The learning for the kiss point of the engine clutch may be performed at the vehicle stop (e.g., the parking stage or the neural stage of the transmission) or during the vehicle driving (e.g., the drive stage or the reverse stage of the transmission), and thus the proposed method may quickly respond to changes in the clutch characteristic.

In one form, the method may control speed of the engine by using a hybrid starter-generator (HSG) that is a second motor in a state in which the motor is responsible for the vehicle driving force during the vehicle driving to perform learning for the kiss point, thereby learning the kiss point without deteriorating the drivability. Therefore, a demand torque from a driver of the vehicle may be the same as an actual drive torque.

In a dual clutch transmission (DCT) transmission-mounted electric device (TMED) system, the method may first perform a hydraulic pressure stabilization process (or a refilling process) for a hydraulic pressure line (or a hydraulic pipe) of the engine clutch before learning the kiss point in order to remove an influence on the learning process, and thus an accurate learning value may be estimated.

Further, the present disclosure may be applied to a TMED system including an automatic transmission (AT) and the wet type engine clutch if the hydraulic pressure stabilization process is omitted. In other words, the TMED system including the automatic transmission (AT) and the wet type engine clutch may estimate (or learn) the engine clutch state during driving of the vehicle by using the method of the present disclosure. The method may have high learning frequency and high learning accuracy, and thus may be applied to the DCT TMED system that includes the dual clutch transmission.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
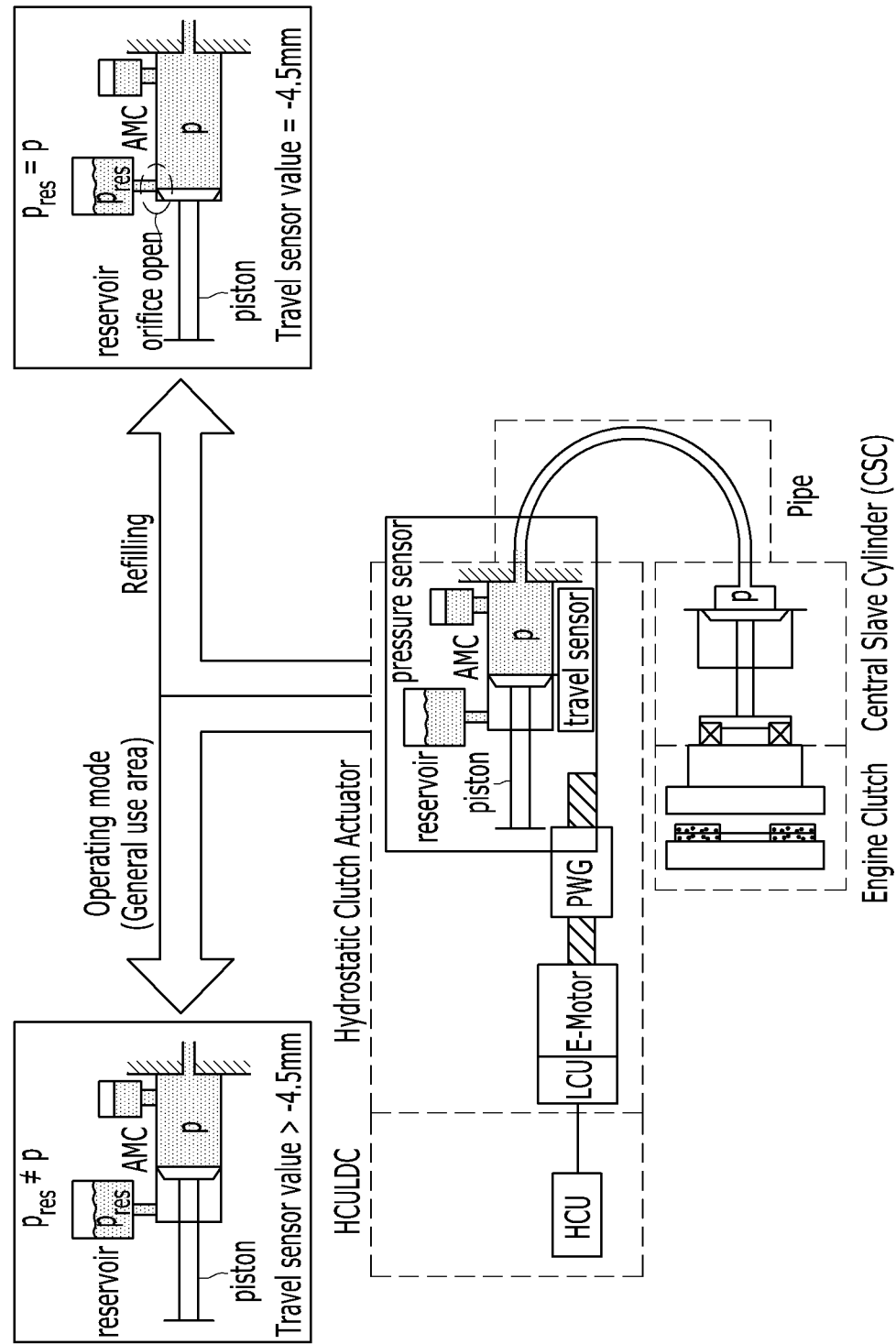
FIG. 1 is a view describing a dry type engine clutch system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the present disclosure, well-known configurations or functions will not be described in detail since they may unnecessarily obscure the gist of the present disclosure.

Terms used in the present specification are only used in order to describe specific exemplary forms rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

A kiss point (or a touch point) of an engine clutch that transmits engine power of a parallel type hybrid vehicle to a wheel should be estimated in order to maintain a fast and correct torque transmission response, and thus a method for estimating the kiss point of the engine clutch is desired.

Kiss point adaptation (or kiss point learning) for the engine clutch that is included in a hybrid vehicle having a Transmission-Mounted Electric Device (TMED) type, which is a related art, is explained as follows. When a gear stage of a transmission is in a parking stage or neutral stage and the vehicle stops, engagement pressure in the engine clutch is gradually increased if kiss point learning condition is satisfied so that torque variation amount of a motor is observed. A point at which the torque variation amount is a predetermined threshold value is detected and stored as the kiss point.

A hybrid vehicle that has the TMED type and includes a wet type engine clutch and an automatic transmission may perform learning the kiss point in a parking stage or in a neural stage of the transmission due to characteristic of the wet type engine clutch.

A kiss point learning method of the engine clutch included in a hybrid vehicle that includes a dual clutch transmission (DCT) transmission-mounted electric device (TMED) system, which is another related art, is explained as follows. When a gear stage of a transmission is in a parking stage and the vehicle stops, the engine clutch may be engaged after an engine is started for engine idle speed control, and zero speed control for a motor is performed. When a point at which torque variation amount of the motor is a predetermined threshold value is detected, and the point is stored as the kiss point.

In the hybrid vehicle that has the DCT TMED and a dry type engine clutch, the dual clutch transmission should frequently perform learning the kiss point as compared with the wet type engine clutch due to unstable characteristic of the dry type engine clutch.

The DCT TMED system performs learning the kiss point only in the parking stage. As a result, when there are bad driving environments such as continuous driving of the vehicle, learning the kiss point may be impractical or impossible, and thus an error occurs in transmission torque calculation that uses the kiss point. Accordingly, slip of the engine clutch may occur during driving of the vehicle, thereby leading to loss in drivability and fuel efficiency of the vehicle.

The TMED system performs learning the kiss point every learning cycle (e.g., 10000 Km) under normal circumstances after a learning value for the kiss point converges. The DCT TMED system may perform learning the kiss point every learning cycle (e.g., 2 hours) under normal circumstances. Therefore, learning the kiss point is desired to be often carried out when the vehicle travels as well as when the transmission is in the parking stage and the vehicle stops.

The TMED system does not require hydraulic pressure stabilization for the engine clutch shown in FIG. 1. FIG. 1 is a view describing an example of a dry type engine clutch system. In the DCT TMED system, a hydraulic pressure stabilization operation (or a refilling operation) for a hydraulic pressure line of the engine clutch needs to be performed every 5 minutes for a structure that includes the hydraulic pressure line (Pipe) and is disposed between a clutch actuator (HCA) shown in FIG. 1 and the engine clutch shown in FIG. 1. Therefore, it is desired to check a stabilization state of the hydraulic pressure line. When the refilling operation is desired, learning the kiss point should be performed after the refilling operation is first performed because a state of the hydraulic pressure line does not have an influence on the learning for the kiss point.

Because the TMED system uses a single learning method (i.e., a method of learning the kiss point when the transmission is in the parking stage and the vehicle stops), hysteresis of a learning value according to direction of relative speed relative to the engine clutch does not need to be considered. The DCT TMED system differently calculates a learning value for the kiss point under a same condition according to direction of relative speed relative to the engine clutch. In other words, there is a difference in learning values for the kiss point that are generated in inequations that are speed of the engine−speed of the motor>0 and speed of the engine−speed of the motor<0. Therefore, learning the kiss point should be performed equally regarding directions of relative speed between the engine that is disposed in an input terminal of the engine clutch and the motor that is disposed in an output terminal of the engine clutch, and thus, a hysteresis effect may be removed.

The TMED system may calculate a learning value for the kiss point by using torque change of the motor. In the DCT TMED system, order of accuracy in torque change is accuracy in torque change of the motor>accuracy in torque change of a hybrid starter-generator (HSG)>>accuracy of torque change of the engine. Therefore, the torque change needs to be checked by using the motor or the HSG in order to accurately calculate a learning value for the kiss point.

Thermal expansion of the hydraulic pressure line included in the engine clutch causes a change in a volume of fluid. The engine clutch is not locked up if the volume is too large, and the engine clutch is not opened if the volume is too small. The volume change may eventually lead to a change in a characteristic curve (or a torque-Stroke curve) of the engine clutch.

A method of stabilizing a hydraulic pressure (or a method of refilling the hydraulic pressure line with a fluid) is as follows. As shown in FIG. 1, an electric motor (E-motor) within the engine clutch may move a piston to −4.5 mm at which an orifice is opened. When the orifice is opened, pressure equalization and volume equalization between the hydraulic pressure line and a reservoir may occur. At this time, by air bleeding phenomenon, air within the hydraulic pressure line may get out.

In a normally closed type engine clutch, the engine clutch is opened if a value of a travel sensor shown in FIG. 1 is large, and the engine clutch is locked up if the value of the travel sensor is small.

Figure 2:
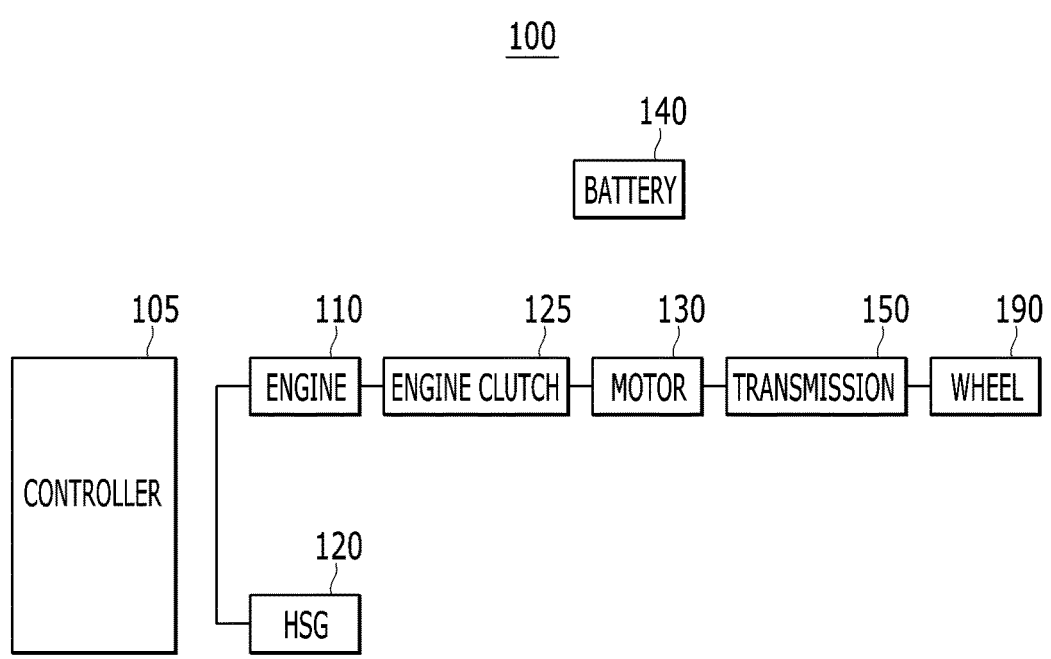
FIG. 2 is a view for explaining a hybrid vehicle including a device for learning engine clutch kiss point.

FIG. 2 is a view for explaining a hybrid vehicle including a device for learning engine clutch kiss point according to one form of the present disclosure.

Referring to FIG. 2, the hybrid vehicle 100 includes a controller 105, an engine 110, a hybrid starter-generator (HSG) 120, an engine clutch 125, a motor (or a driving motor) 130 which may be an electric motor, a battery 140, a transmission 150, and wheels (or driving wheels) 190.

The device for learning engine clutch kiss point of the hybrid vehicle may include the controller 105 and the engine clutch 125. When the vehicle 100 meets a particular driving situation, the controller 105 may control the engine to have a specific speed by using the HSG 120 that is a second motor in an electric vehicle (EV) mode in which the motor 130 that is a first motor is responsible for the vehicle driving force and may slowly engage the engine clutch to store a point at which torque variation amount of the HSG is a certain value as a kiss point. The particular driving situation may mean electric vehicle (EV) start driving or electric vehicle (EV) coasting driving.

The kiss point may mean an initial hydraulic pressure by which torque is started to be transmitted as two friction members included in the engine clutch 125 are in contact with each other. A slip state of the engine clutch 125 may be started at the kiss point. The kiss point may be a starting point of torque delivery, and may be the pressure of the fluid that converts a state of the engine clutch into a slip state in which the clutch starts friction.

The hybrid vehicle 100, which is a hybrid electric vehicle, may use the engine 110 and the motor 130 as power sources, and includes the engine clutch 125 existing between the engine 110 and the motor 130 so that the hybrid vehicle 100 may be operated in the electric vehicle (EV) mode in which the hybrid vehicle 100 travels by the motor 130 in a state where the engine clutch 125 is opened, and in a hybrid electric vehicle (HEV) mode in which the hybrid vehicle 100 is capable of travelling by both the motor 130 and the engine 110 in a state where the engine clutch 125 is closed.

The hybrid vehicle 100 may include a power train of a transmission-mounted electric device (TMED) type in which the motor 130 is connected to the transmission 150. The hybrid vehicle 100 may provide a driving mode, such as the EV mode and the HEV mode. In the EV mode, the hybrid vehicle 100 uses only power of the motor, and in the HEV mode, it uses rotational force of the engine as main power and uses rotational force of the motor as auxiliary power depending on whether the engine clutch 125 that is disposed between the engine 110 and the motor 130 is engaged (or connected). In more detail, the hybrid vehicle 100 includes a structure in which the motor 130 may be directly connected to the transmission 150, revolutions per minute (RPM) of the engine may be increased by drive of the HSG 120, power delivery and power cutoff between the engine and the motor may be performed via engagement and release of the clutch 125, a driving force may be transmitted (or transferred) to the wheels 190 through a power transmission system which may include the transmission 150, and torque of the engine may be transmitted to the motor via engagement of the clutch 125 when transmission of the engine torque is requested.

The controller 105 may include a hybrid control unit (HCU), a motor control unit (MCU), an engine control unit (ECU), and a transmission control unit (TCU).

The HCU may control starting of the engine by controlling the HSG 120 when the engine 110 stops. The HCU may be the highest controller, and may synthetically control controllers (for example, the MCU) connected to a network such as a controller area network (CAN) which is a vehicle network, and may control overall operation of the hybrid vehicle 100.

The MCU may control the HSG 120 and the motor 130. The MCU may control an output torque of the driving motor 130 through the network depending on the control signal output from the HCU, and thus may control the motor to operate at high efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter converts a direct current (DC) voltage that is supplied from the battery 140 into a three-phase alternating current (AC) voltage to drive the driving motor 130. The MCU may be disposed between the battery 140 and the motor 130.

The ECU may control a torque of the engine 110. The ECU may control an operating point (or a driving point) of the engine 110 through the network depending on a control signal output from the HCU, and may control the engine to output an optimal torque. The TCU may control an operation of the transmission 150.

The controller 105 may determine whether power transference of the transmission 150 transmitting the output from the engine 110 and the motor 130 is interrupted by using a sensor that may be connected (or attached) to the transmission 150. The controller 105 may determine that power transference of the transmission 150 is interrupted when the transmission 150 is in a parking stage or a neutral stage.

When a gear shift stage of the transmission 150 is in the parking stage or the neutral stage, the engine 110 and the motor 130 may be in a no-load state and the hybrid vehicle 100 may be in a non-movement state. In other words, when the gear shift stage is in the parking stage or the neutral stage, an accelerator is not operated so that the vehicle may not be operated. For example, the controller 105 may determine whether the gear shift stage is in the parking stage or the neutral stage by using an inhibitor switch.

For example, the controller 105 may be one or more microprocessors operated by a program or hardware including the microprocessor. The program may include a series of commands for executing a method for learning engine clutch kiss point of the hybrid vehicle according to the present disclosure, which will be described below.

The engine 110 may include a diesel engine, a gasoline engine, a liquefied natural gas (LNG) engine, or a liquefied petroleum gas (LPG) engine, and may output a torque at the operating point depending on a control signal output from the ECU. The torque may be combined with driving force of the driving motor 130 in the HEV mode.

The HSG 120 may operate as a motor depending on a control signal output from the MCU to start the engine 110, and may operate as a generator in a state in which start of the engine 110 is maintained to provide generated electric power to the battery 140 via the inverter. The HSG 120 may be connected to the engine 110 through a belt. The HSG 120, which is a motor that cranks the engine, may be directly connected to the engine. If a disturbance enters by slowly engaging the engine clutch in a stable state in which the HSG 120 controls the engine to have a specific speed, the HSG may increase or may decrease a torque in order to maintain a target speed of the engine.

The engine clutch 125 may be disposed (or mounted) between the engine 110 and the driving motor 130, and may be operated to switch power delivery between the engine 110 and the motor 130. The engine clutch 125 may connect or intercept power between the engine and the motor depending on switching of the HEV mode and the EV mode. The engine clutch 125, which is a device for transmitting the engine torque to the wheel, may include a wet type engine clutch or a dry type engine clutch shown in FIG. 1. Operation of the engine clutch 125 may be controlled by the controller 105.

The engine clutch 125 may include a hydrostatic clutch actuator in order to stabilize a hydraulic pressure. When a hydraulic pressure stabilization operation (or a refilling operation) of the engine clutch is desired, the refilling operation may be first performed before learning for the kiss point. The refilling operation may be performed by fully engaging the engine clutch when the vehicle stops, gear stage of the transmission 150 is the parking stage, a drive stage (or a driving stage), a reverse stage or the neutral stage, a brake pedal is in an on-state or an off-state, and the engine and the motor are in a stop state. The refilling operation may be performed by locking the engine clutch up (or fully engaging the engine clutch) when the vehicle 100 travels in the HEV mode, gear stage of the transmission is the drive stage or the reverse stage, and an accelerator pedal is in an on-state. When the engine clutch is in a lock-up state, the engine speed may match the motor speed.

The on-state or an off-state of the accelerator pedal may be detected by an acceleration pedal position sensor (APS) included in the vehicle 100. The APS may continuously measure a position value of the accelerator pedal. The position value of the accelerator pedal may be 100% when the accelerator pedal is fully depressed and the position value of the accelerator pedal may be 0% when the accelerator pedal is not depressed. The on-state or the off-state of the brake pedal may be detected by a brake pedal position sensor (BPS) of the vehicle 100. The BPS may continuously measure a position value of the brake pedal. The position value of the brake pedal may be 100% when the brake pedal is fully depressed and the position value of the brake pedal may be 0% when the brake pedal is not depressed.

The engine clutch 125 may be engaged by pressure of a fluid (e.g., oil) that is supplied to the engine clutch 125. The pressure of fluid for engaging the engine clutch 125 may be pressure above the kiss point that is start engagement pressure of the engine clutch, and may be controlled by the controller 105.

The motor 130 may be operated by a three-phase AC voltage that is output from the MCU to generate a torque. The motor 130 may be operated as a generator during coasting drive or regenerative braking to supply a voltage (or regenerative energy) to the battery 140. The motor 130 may be responsible for a driving demand torque determined by the accelerator pedal in electric vehicle (EV) mode start situation and may be responsible for regeneration brake torque corresponding to friction torque of the engine in electric vehicle (EV) mode coasting driving situation.

The battery 140 may include a plurality of unit cells. A high voltage for providing a driving voltage (for example, 350-450 V DC) to the motor 130 that provides driving power to the wheels 190 may be stored in the battery 140.

The transmission 150 may be a multiple speed transmission, such as an automatic transmission or a dual clutch transmission (DCT), or a continuously variable transmission (CVT), and may shift to a desired gear by using hydraulic pressure depending on control of the TCU to operate engagement elements and disengagement elements. The transmission 150 may transmit driving force of the engine 110 and/or the motor 130 to the wheels 190, and may intercept power delivery between the motor 130 (or the engine 110) and the wheels 190. The transmission 150 may include a gearbox.

Figure 3:
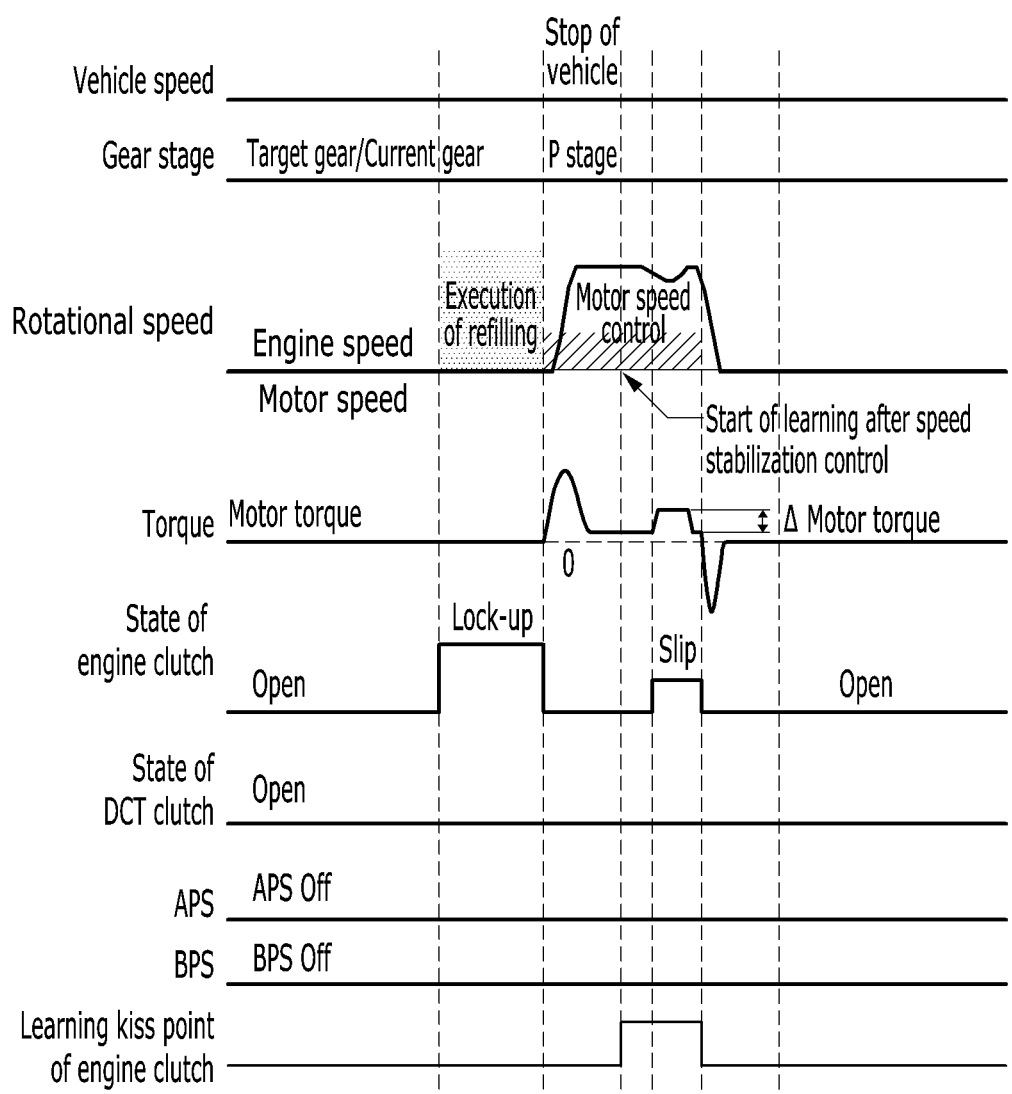
FIG. 3 is a view explaining one form of a method for learning engine clutch kiss point of the hybrid vehicle shown in FIG. 2.

FIG. 3 is a timing chart explaining one form of the method for learning engine clutch kiss point of the hybrid vehicle shown in FIG. 2. The method for learning engine clutch kiss point of the hybrid vehicle may be a kiss point learning method using the first motor 130 during stop of the vehicle.

Referring to FIG. 2 and FIG. 3, a condition for entering stabilization operation for a hydraulic pressure line included in the engine clutch 125 may include a condition in which a lever (or gear stage) of the transmission 150 transmitting output of the engine 110 and output of the motor 130 is in the parking stage or the neutral stage, the hybrid vehicle is in a stopped state, a state of charge (SOC) of the battery 140 is within a normal range, the battery and the motor are not in a limited state, the accelerator pedal is in the off-state, the brake pedal is in the off-state, and the engine is in a stopped state. The stabilization operation may be also referred to as the refilling operation and may mean an operation for refilling the hydraulic pressure line of the engine clutch 125 with a fluid. Whether the condition for entering stabilization operation is satisfied may be determined by the controller 105.

When the condition for entering stabilization operation is satisfied, the controller 105 may control the engine clutch 125 which connects the engine 110 with the motor 130 or disconnects the engine from the motor so that the engine clutch is engaged after the controller checks stop of the engine and stop of the motor and the stabilization operation is performed. The controller 105 may control the engine clutch to be released (or opened) after completion of the stabilization operation.

A kiss point entering condition for determining (or learning) the kiss point of the engine clutch 125 that is determined after the stabilization operation may include a condition in which the lever of the transmission 150 is in the parking stage or the neutral stage, the vehicle 100 is in the stopped state, the state of charge (SOC) of the battery 140 is within the normal range, the battery and the motor are not in the limited state, the accelerator pedal is in the off-state, the brake pedal is in the off-state, and the engine is in a stopped state. Whether the kiss point entering condition is satisfied may be determined by the controller 105.

When the kiss point entering condition is satisfied, the controller 105 may control the motor 130 to have a certain speed (or a specific speed) (e.g., 100 revolutions per minute (RPM)). The controller 105 may control the engine clutch 125 to be engaged (or slip-engaged) after speed of the motor 130 is stabilized. The controller 105 may determine whether torque variation of the motor which occurs when the engine clutch is engaged is equal to or greater than a threshold value (or a reference value) (e.g., 5 Nm). The controller 105 may determine hydraulic pressure at which the torque variation is the threshold value as the kiss point of the engine clutch 125. The controller 105 may release the engine clutch after completion of the learning for the kiss point.

The kiss point learning method may stop the engine 110 and may control the motor to have an extremely low speed, thereby reducing a noise. Zero speed control for the motor after completion of the learning the kiss point may solve a drive stage start problem or a reverse stage start problem, and may prevent noise problems caused by cogging torque during freewheeling of the motor. The zero speed control may adjust speed of the motor to become 0.

In FIG. 3, an open state of the clutch may mean a state in which both ends of the engine clutch do not interfere with each other and the engine clutch is physically separated. A slip state of the clutch may mean a state in which the clutch starts friction and a speed difference between the both ends is above a predetermined value. A lock-up state of the clutch may mean a state in which there is no speed difference between the both ends and 100% torque applied to the input of the clutch is transferred to output of the clutch.

Figure 4:
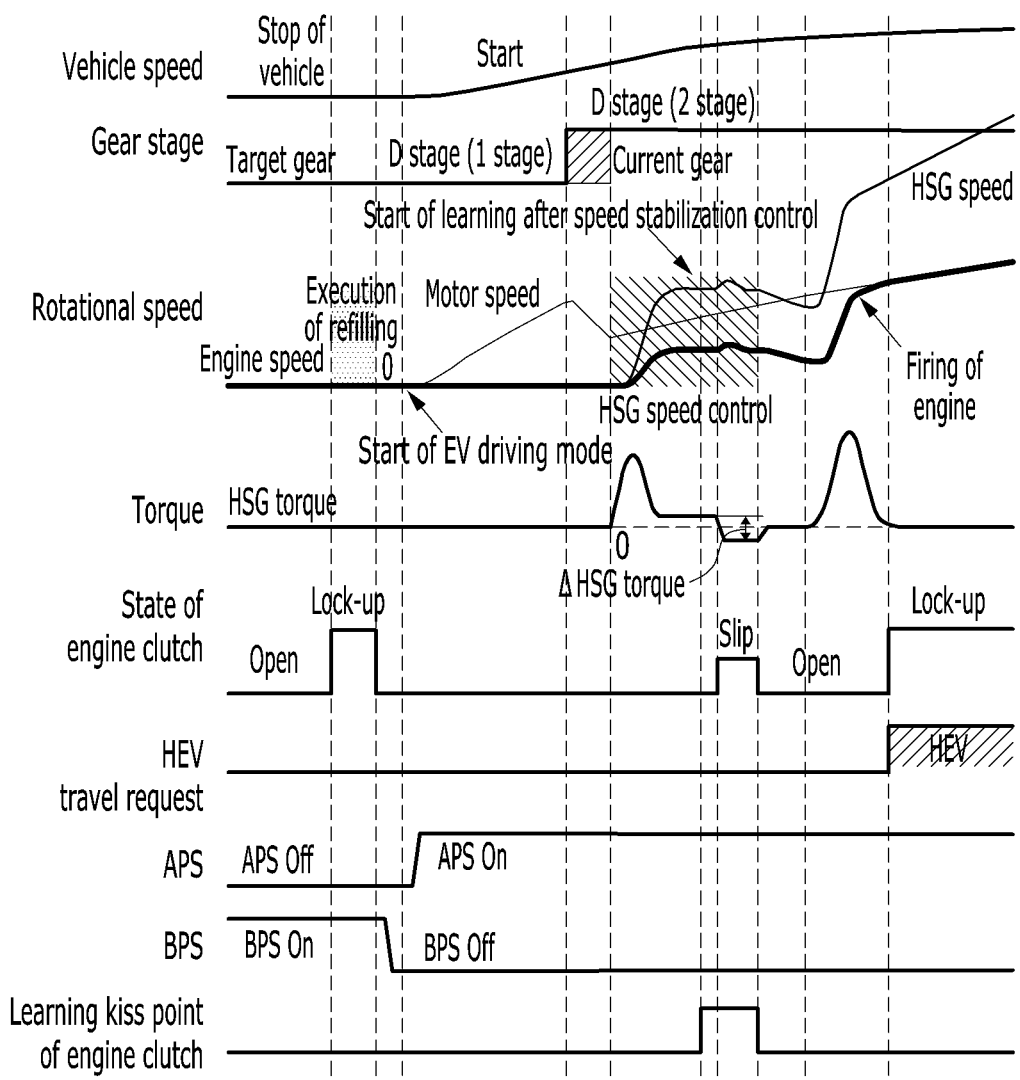
FIG. 4 is a view explaining another form of the method for learning engine clutch kiss point of the hybrid vehicle shown in FIG. 2.

FIG. 4 is a timing chart explaining another form of the method for learning engine clutch kiss point of the hybrid vehicle shown in FIG. 2. The method for learning engine clutch kiss point of the hybrid vehicle may be a kiss point learning method using the second motor 120 when the hybrid vehicle 100 starts in the EV mode.

Referring to FIG. 2 and FIG. 4, a condition for entering stabilization operation for the hydraulic pressure line of the engine clutch 125 may include a condition in which the lever of the transmission 150 is the drive stage, the reverse stage, or the neutral stage, the vehicle 100 is in the stopped state, the state of charge (SOC) of the battery 140 is within the normal range, the battery and the motor are not in the limited state, the accelerator pedal is in the off-state, the brake pedal is in the on-state, and the engine is in the stopped state. Whether the condition for entering stabilization operation is satisfied may be determined by the controller 105.

Before the condition for entering stabilization operation is satisfied and the hybrid vehicle 100 operates in the EV mode, the controller 105 may control the engine clutch 125 so that the engine clutch is engaged after the controller checks stop of the engine and stop of the motor and the stabilization operation is performed. The controller 105 may control the engine clutch to be released after completion of the stabilization operation.

According to another form of the present disclosure, the stabilization operation may be omitted in the method for learning engine clutch kiss point of the hybrid vehicle.

A kiss point entering condition for determining (or learning) the kiss point of the engine clutch 125 that is determined after the stabilization operation may include a condition in which the lever of the transmission 150 is in the drive stage or the reverse stage, the state of charge (SOC) of the battery 140 is within the normal range, the battery and the motor are not in the limited state, the accelerator pedal is in the on-state and in an acceleration state that is not a sudden acceleration state, the brake pedal is in the off-state, the engine is in the stopped state, and the hybrid vehicle 100 operates (or travels) in the EV mode by starting the first motor 130. Whether the kiss point entering condition is satisfied may be determined by the controller 105. In the drive stage, a clutch included in the transmission 150 may be released (or opened).

When the kiss point entering condition is satisfied, the controller 105 may control the second motor 120 that is connected to the engine 110 to have a certain speed (e.g., speed of the second motor 120 that makes the engine have 1000 revolutions per minute (RPM) in a state in which a cylinder of the engine is not fired). The controller 105 may control the engine clutch 125 that connects the engine 110 with the first motor 130 that starts the hybrid vehicle 100 in the EV mode or disconnects the engine from the first motor to be engaged (or slip-engaged) after speed of the second motor 120 is stabilized. The controller 105 may determine whether torque variation of the second motor 120 which occurs when the engine clutch is engaged is equal to or greater than a threshold value (e.g., 5/2.48 Nm). The controller 105 may determine hydraulic pressure at which the torque variation is the threshold value as the kiss point of the engine clutch 125. The controller 105 may release the engine clutch after completion of the learning for the kiss point, and may complete speed control of the second motor 120.

The kiss point learning method may be applied to the learning for the kiss point in a second stage of the drive stage, considering a gear ratio of the DCT. Because the present disclosure may perform the learning for the kiss point in a region in which speed of the engine is less than speed of the motor 130, hysteresis problem of a learning value according to direction of relative speed relative to the engine clutch may be inhibited and the learning for the kiss point may be performed in a congested section or in a section in which the vehicle repeatedly stops and starts. A disturbance may be introduced to the second motor 120 when the engine is started, thereby causing inaccurate learning for the kiss point.

Figure 5:
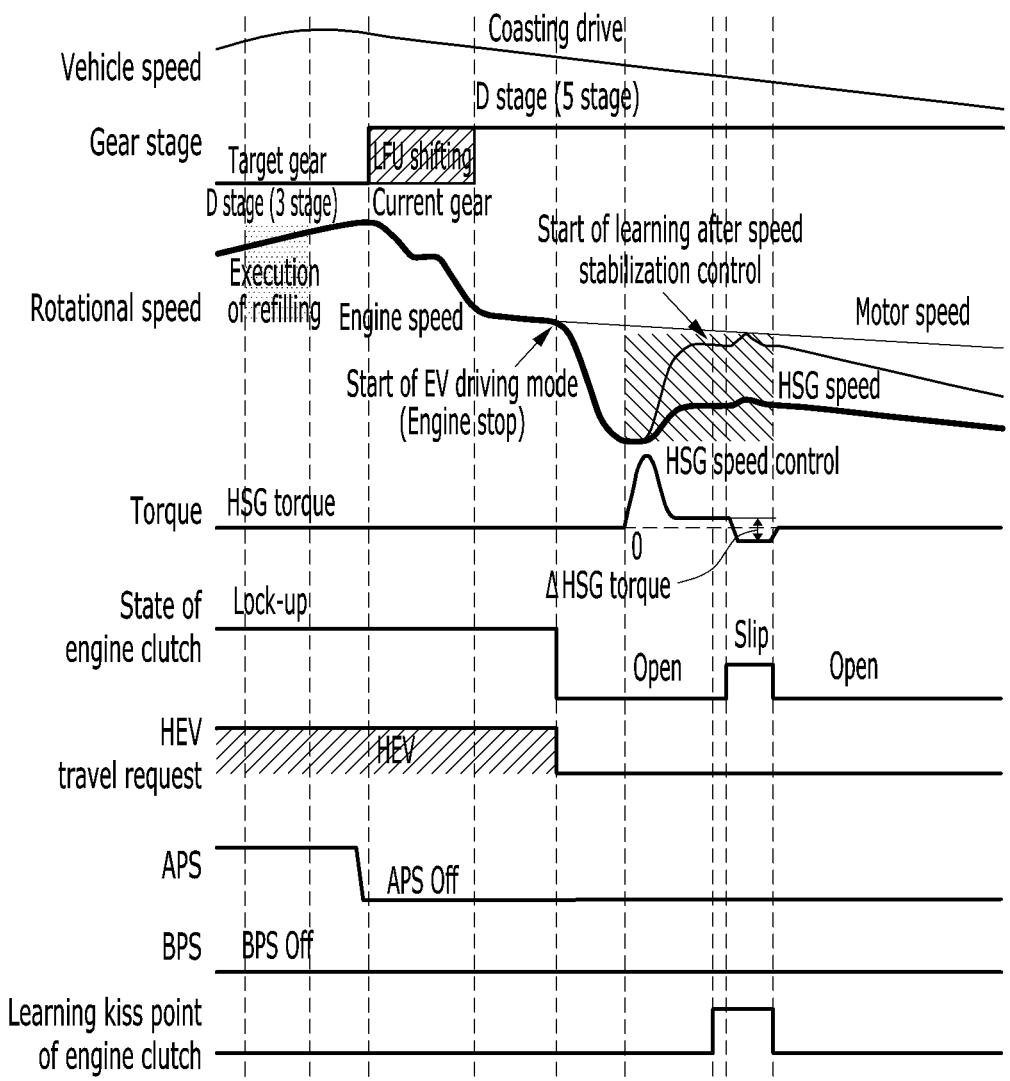
FIG. 5 is a view explaining another form of the method for learning engine clutch kiss point of the hybrid vehicle shown in FIG. 2.

FIG. 5 is a timing chart explaining another form of the method for learning engine clutch kiss point of the hybrid vehicle shown in FIG. 2. The method for learning engine clutch kiss point of the hybrid vehicle may be a kiss point learning method using the second motor 120 when the hybrid vehicle 100 performs a coasting drive in the EV mode.

Referring to FIG. 2 and FIG. 5, a condition for entering stabilization operation for the hydraulic pressure line of the engine clutch 125 may include a condition in which the lever of the transmission 150 is in the drive stage or the reverse stage, the state of charge (SOC) of the battery 140 is within the normal range, the battery and the motor are not in the limited state, the accelerator pedal is in the on-state or in the off-state, the brake pedal is in the off-state, the engine clutch is in an engagement state, and the hybrid vehicle 100 travels in the HEV mode. Whether the condition for entering stabilization operation is satisfied may be determined by the controller 105.

Before the condition for entering stabilization operation is satisfied and the hybrid vehicle 100 performs the coasting drive in the EV mode, the controller 105 may control the engine clutch 125 so that the stabilization operation is performed in a state in which the engine clutch is engaged. The engine speed may be the same as speed of the motor 130 in the state in which the engine clutch 125 is engaged. The controller 105 may maintain engagement of the engine clutch 125 after completion of the stabilization operation.

According to another form of the present disclosure, the stabilization operation may be omitted in the method for learning engine clutch kiss point of the hybrid vehicle.

A kiss point entering condition for determining (or learning) the kiss point of the engine clutch 125 that is determined after the stabilization operation may include a condition in which the lever of the transmission 150 is in the drive stage or the reverse stage, the transmission is not in a shifting state, the state of charge (SOC) of the battery 140 is within the normal range, the battery and the motor are not in the limited state, the accelerator pedal is in the off-state, the brake pedal is in the off-state, the engine is in the stopped state, and the hybrid vehicle 100 performs the coasting drive in the EV mode by releasing the engine clutch. Whether the kiss point entering condition is satisfied may be determined by the controller 105. In the drive stage, a clutch included in the transmission 150 may be released (or opened)

When the kiss point entering condition is satisfied, the controller 105 may control the second motor 120 that is connected to the engine 110 to have a certain speed (e.g., speed of the second motor 120 that makes the engine have 1000 revolutions per minute (RPM) in a state in which a cylinder of the engine is not fired). The controller 105 may control the engine clutch 125 to be engaged (or slip-engaged) after speed of the second motor 120 is stabilized. The controller 105 may determine whether torque variation of the second motor 120 which occurs when the engine clutch is engaged is equal to or greater than a threshold value (e.g., 5/2.48 Nm). The controller 105 may determine hydraulic pressure at which the torque variation is the threshold value as the kiss point of the engine clutch 125. The controller 105 may release the engine clutch after completion of the learning for the kiss point, and may complete speed control of the second motor 120.

In another form, the method of the present disclosure may perform the learning for the kiss point at a time interval at which the hybrid vehicle 100 performs the coasting drive in the EV mode and a shifting (or a gear shifting) in the transmission is not performed. Because the present disclosure may perform the learning for the kiss point in a region in which speed of the engine is less than speed of the motor 130, hysteresis problem of a learning value according to direction of relative speed relative to the engine clutch may be inhibited or prevented.

When the hybrid vehicle 100 performs the coasting drive in the EV mode freewheeling, the motor 130 is not in a freewheeling state and may output a negative friction torque against the engine. In one form<the method may perform the learning for the kiss point during middle or high speed traveling of the vehicle.

Figure 6:
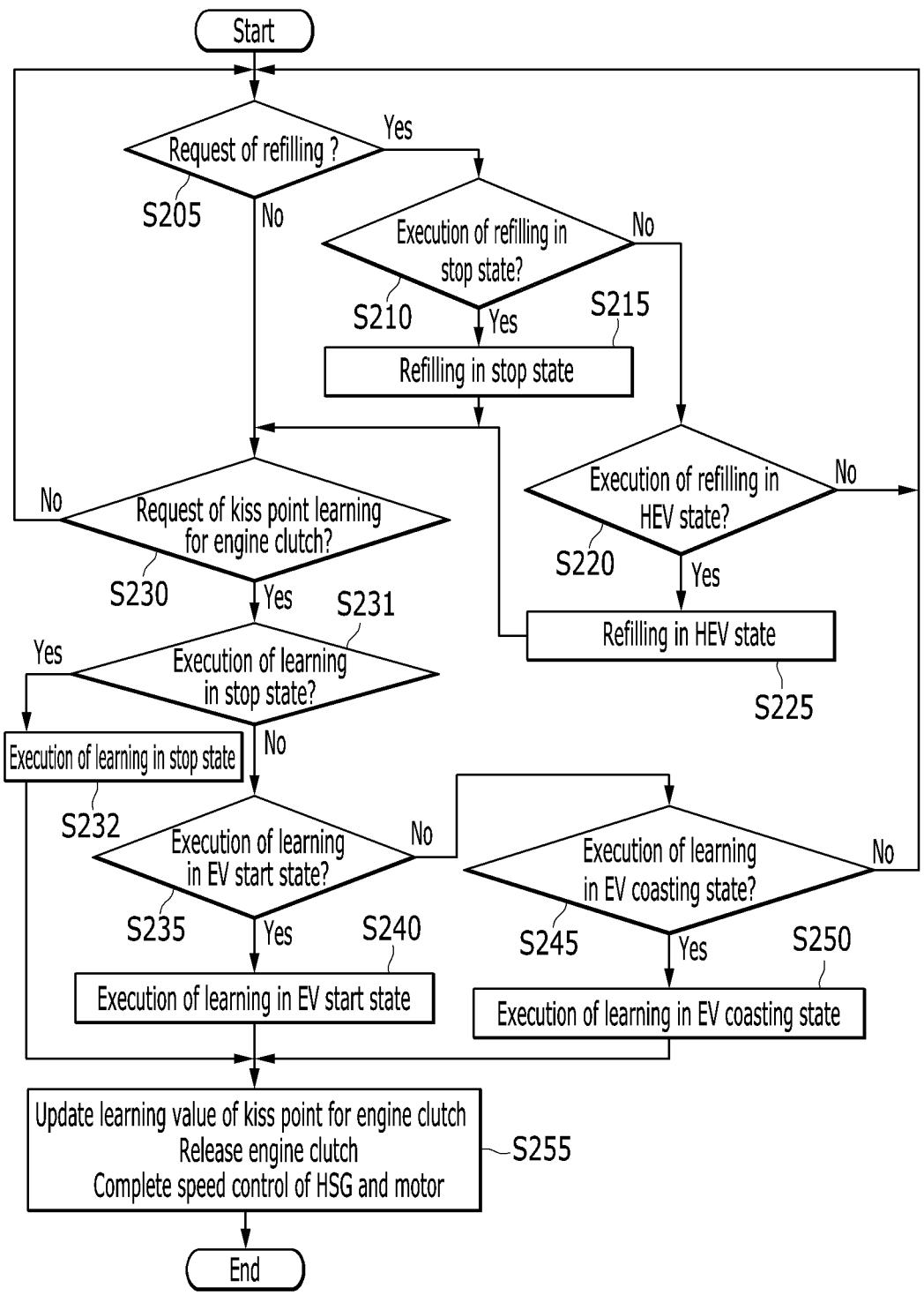
FIG. 6 is a flowchart describing the method for learning engine clutch kiss point of the hybrid vehicle.

FIG. 6 is a flowchart describing the method for learning engine clutch kiss point of the hybrid vehicle according to one form of the present disclosure.

The method for learning engine clutch kiss point of the hybrid vehicle may be applied to the hybrid vehicle 100 that includes the device for learning engine clutch kiss point and is shown in FIG. 2.

Referring to FIGS. 1 through 6, in a refilling request determining step S205, the controller 105 may determine whether the controller requests that the stabilization operation for the hydraulic pressure line of the engine clutch 125 should be performed. The stabilization operation may be also referred to as the refilling operation and may mean an operation for refilling the hydraulic pressure line of the engine clutch 125 with a fluid.

According to a refilling determining step S210, when it is requested that the stabilization operation should be performed, the controller 105 may determine whether the engine clutch 125 can perform the refilling operation in a stopped state of the vehicle 100. A condition for performing the refilling operation may include a condition in which the lever of the transmission 150 is in the parking stage, the drive stage, the reverse stage or the neutral stage, the vehicle 100 is in the stopped state, the state of charge (SOC) of the battery 140 is within the normal range, the battery and the motor are not in the limited state, the accelerator pedal is in the off-state, the brake pedal is in the on-state, and the engine is in the stopped state.

According to a refilling step S215, when it is determined that the refilling operation can be performed in the stopped state of the vehicle, the controller 105 may control the engine clutch 125 so that the engine clutch is engaged after the controller checks stop of the engine 110 and stop of the motor 130 and the refilling operation is performed. The controller 105 may release the engine clutch after completion of the refilling operation.

According to a refilling determining step S220, when it is determined that the refilling operation cannot be performed in the stopped state of the vehicle, the controller 105 may determine whether the engine clutch 125 can perform the refilling operation in the HEV mode (or a HEV state) of the vehicle 100. A condition for performing the refilling operation may include a condition in which the lever of the transmission 150 is in the drive stage or the reverse stage, the vehicle 100 is in the stopped state, the state of charge (SOC) of the battery 140 is within the normal range, the battery and the motor are not in the limited state, the accelerator pedal is in the on-state or in the off-state, the brake pedal is in the off-state, the engine clutch is in the engagement state, and the hybrid vehicle 100 travels in the HEV mode.

According to a refilling step S225, when it is determined that the refilling operation can be performed in the HEV mode of the vehicle, the controller 105 may control the engine clutch 125 so that the refilling operation is performed after the controller checks whether the engine clutch is in the engagement state. The controller 105 may maintain engagement of the engine clutch 125 after completion of the refilling operation. The engine speed may be the same as speed of the motor 130 in the state in which the engine clutch 125 is engaged.

According to a learning request determining step S230, when it is not requested that the stabilization operation should be performed or after the S225 step, the controller 105 may determine whether the controller requests that a kiss point learning for the engine clutch 125 should be performed.

According to a learning condition determining step S231, when it is requested that the kiss point learning should be performed, the controller 105 may determine whether the engine clutch 125 can perform a kiss point learning operation in the stopped state of the vehicle 100. A condition for performing the kiss point learning operation in the stopped state of the vehicle may include a condition in which the lever of the transmission 150 is in the parking stage or the neutral stage, the vehicle 100 is in the stopped state, the state of charge (SOC) of the battery 140 is within the normal range, the battery and the motor are not in the limited state, the accelerator pedal is in the off-state, the brake pedal is in the off-state, and the engine is in the stopped state.

According to a learning step S232 and S255, when it is determined that the kiss point learning operation can be performed in the stopped state of the vehicle, the controller 105 may control the motor 130 to have a certain speed (e.g., 100 RPM), may control the engine clutch 125 to be engaged after speed of the motor 130 is stabilized so that the controller may determine (or update) hydraulic pressure at which torque variation of the motor is a threshold value (e.g., 5 Nm) as the kiss point of the engine clutch, and may release the engine clutch after completion of the learning for the kiss point.

According to a learning condition determining step S235, when it is determined that the kiss point learning operation cannot be performed in the stopped state of the vehicle, the controller 105 may determine whether the engine clutch 125 can perform a kiss point learning operation in an EV mode start state of the vehicle 100. A condition for performing the kiss point learning operation in the EV mode start state may include a condition in which the lever of the transmission 150 is in the drive stage or the reverse stage, the state of charge (SOC) of the battery 140 is within the normal range, the battery and the motor are not in the limited state, the accelerator pedal is in the on-state and in an acceleration state that is not a sudden acceleration state, the brake pedal is in the off-state, the engine is in the stopped state, and the vehicle 100 starts in the EV mode.

According to a learning step S240 and S255, when it is determined that the kiss point learning operation can be performed in the EV mode start state, the controller 105 may control the second motor 120 to have a certain speed (e.g., speed of the second motor 120 that makes the engine have 1000 RPM in a state in which a cylinder of the engine is not fired), may control the engine clutch 125 to be engaged after speed of the second motor 120 is stabilized so that the controller may determine (or update) hydraulic pressure at which torque variation of the second motor is a threshold value (e.g., 5/2.48 Nm) as the kiss point of the engine clutch, may release the engine clutch after completion of the learning for the kiss point, and may complete speed control of the second motor.

According to a learning condition determining step S245, when it is determined that the kiss point learning operation cannot be performed in the EV mode start state, the controller 105 may determine whether the engine clutch 125 can perform a kiss point learning operation in an EV mode coasting driving state of the vehicle 100. A condition for performing the kiss point learning operation in the EV mode coasting driving state may include a condition in which the lever of the transmission 150 is in the drive stage or the reverse stage, the transmission is not in the shifting state, the state of charge (SOC) of the battery 140 is within the normal range, the battery and the motor are not in the limited state, the accelerator pedal is in the off-state, the brake pedal is in the off-state, the engine is in the stopped state, and the vehicle 100 performs the coasting drive in the EV mode by releasing the engine clutch.

According to a learning step S250 and S255, when it is determined that the kiss point learning operation can be performed in the EV mode coasting driving state, the controller 105 may control the second motor 120 to have a certain speed (e.g., speed of the second motor 120 that makes the engine have 1000 RPM in a state in which a cylinder of the engine is not fired), may control the engine clutch 125 to be engaged after speed of the second motor 120 is stabilized so that the controller may determine (or update) hydraulic pressure at which torque variation of the second motor is a threshold value (e.g., 5/2.48 Nm) as the kiss point of the engine clutch, may release the engine clutch after completion of the learning for the kiss point, and may complete speed control of the second motor.

The components, "~ unit", block, or module which are used in the present disclosure may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

Here, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent forms are possible from the present disclosure. Accordingly, the actual technical protection scope of the present disclosure must be determined by the spirit of the present disclosure.

DESCRIPTION OF SYMBOLS

105: controller
110: engine
120: second motor
125: engine clutch
130: first motor
150: transmission

What is claimed is:

1. A method for learning an engine clutch kiss point of a hybrid vehicle, the method comprising:
   controlling, by a controller, an engine clutch configured to connect an engine with a motor or disconnect the engine from the motor so that the engine clutch is engaged after the controller checks a stop of the engine and a stop of the motor and stabilization operation for a hydraulic pressure line of the engine clutch is performed;
   controlling, by the controller, the motor to have a certain speed after the stabilization operation is performed;
   controlling, by the controller, the engine clutch to be engaged after a speed of the motor is stabilized;
   determining, by the controller, whether torque variation of the motor which occurs when the engine clutch is engaged is equal to or greater than a threshold value; and
   determining, by the controller, a hydraulic pressure at which the torque variation is the threshold value as a kiss point of the engine clutch.

2. The method of claim 1, wherein a condition for entering the stabilization operation includes a condition in which a transmission configured to transmit an output of the engine and an output of the motor is in a parking stage, and in which the hybrid vehicle is in a stopped state.

3. The method of claim 1, wherein a kiss point entering condition for determining the kiss point of the engine clutch includes a condition in which a transmission configured to transmit an output of the engine and an output of the motor is in a parking stage, and in which the hybrid vehicle is in a stopped state.

4. A method for learning an engine clutch kiss point of a hybrid vehicle, the method comprising:
   controlling, by a controller, a second motor which is connected to an engine to have a certain speed;
   controlling, by the controller, an engine clutch configured to connect the engine with a first motor that is configured to start the hybrid vehicle in an electric vehicle mode or disconnect the engine from the first motor to be engaged after a speed of the second motor is stabilized;
   determining, by the controller, whether torque variation of the second motor which occurs when the engine clutch is engaged is equal to or greater than a threshold value; and
   determining, by the controller, a hydraulic pressure at which the torque variation is the threshold value as a kiss point of the engine clutch.

5. The method of claim 4, further comprising:
   before the hybrid vehicle operates in the electric vehicle mode, the controller controls the engine clutch so that the engine clutch is engaged after the controller checks a stop of the engine and of the motor and stabilization operation for a hydraulic pressure line of the engine clutch is performed.

6. The method of claim 5, wherein a condition for entering the stabilization operation includes a condition in which a transmission configured to transmit an output of the engine and of the motor is in a drive stage, in a reverse stage or in a neutral stage, and the hybrid vehicle is in a stopped state.

7. The method of claim 4, wherein a kiss point entering condition for determining the kiss point of the engine clutch includes a condition in which a transmission configured to transmit an output of the engine and of the motor is in a drive stage or in a reverse stage.

8. A method for learning an engine clutch kiss point of a hybrid vehicle, the method comprising:

controlling, by a controller, a second motor which is connected to an engine to have a certain speed;

controlling, by the controller, an engine clutch configured to connect the engine with a first motor or disconnect the engine from the first motor, the engine clutch being released when the hybrid vehicle performs a coasting drive in an electric vehicle mode to be engaged after a speed of the second motor is stabilized;

determining, by the controller, whether torque variation of the second motor which occurs when the engine clutch is engaged is equal to or greater than a threshold value; and determining, by the controller, a hydraulic pressure at which the torque variation is the threshold value as a kiss point of the engine clutch.

9. The method of claim 8, further comprising:

before the hybrid vehicle performs the coasting drive in the electric vehicle mode, the controller controls the engine clutch so that stabilization operation for a hydraulic pressure line of the engine clutch is performed in an engagement state of the engine clutch.

10. The method of claim 9, wherein a condition for entering the stabilization operation includes a condition in which a transmission configured to transmit an output of the engine and of the motor is in a drive stage or in a reverse stage, and the hybrid vehicle travels in a hybrid electric vehicle mode.

11. The method of claim 8, wherein a kiss point entering condition for determining the kiss point of the engine clutch includes a condition in which a transmission configured to transmit an output of the engine and of the motor is in a drive stage or in a reverse stage.

* * * * *